United States Patent [19]

Spratt et al.

[11] 4,108,411

[45] Aug. 22, 1978

[54] PORTABLE, COLLAPSIBLE HOISTING AND SUPPORTING APPARATUS

[76] Inventors: Eugene M. Spratt, 2057 Olive Ave.; Robert C. Dominguez, 38675 Paseo Padre Pkwy., #225, both of Fremont, Calif. 94538

[21] Appl. No.: 780,164

[22] Filed: Mar. 22, 1977

[51] Int. Cl.[2] .......... F16M 11/32

[52] U.S. Cl. .......... 248/165; 182/186; 182/226; 248/166

[58] Field of Search .......... 52/90, 93; 182/181-186, 224-227; 248/150, 163, 165, 166, 434, 436, 370; 254/4 R, 139.1

[56] References Cited

U.S. PATENT DOCUMENTS

| | | | |
|---|---|---|---|
| 564,504 | 7/1896 | Cody | 248/165 X |
| 1,035,575 | 8/1912 | Goode | 248/166 X |
| 1,224,893 | 5/1917 | Beckwith | 248/166 X |
| 2,127,899 | 8/1938 | Westwang | 182/186 |
| 2,598,798 | 6/1952 | Kerr | 248/166 X |
| 2,793,003 | 5/1957 | Borchers | 182/186 X |
| 4,030,705 | 6/1977 | Bontrager | 180/64 R |

FOREIGN PATENT DOCUMENTS

| | | | |
|---|---|---|---|
| 2,341,210 | 2/1975 | Fed. Rep. of Germany | 182/226 |
| 151,740 | 11/1932 | Switzerland | 248/166 |

*Primary Examiner*—Lawrence J. Staab

*Attorney, Agent, or Firm*—Warren M. Becker

[57] ABSTRACT

A portable, collapsible hoisting and supporting apparatus is described comprising an arched cross member and two triangularly-shaped end supporting assemblies for supporting the ends of the arched cross member, means for attaching hoisting tackle to the arched cross member and a windlass or the like to one of the end assemblies, and means for folding the arched cross member and the end assemblies for reducing the overall size of the apparatus for transportation and storage.

8 Claims, 18 Drawing Figures

PORTABLE, COLLAPSIBLE HOISTING AND SUPPORTING APPARATUS

BACKGROUND OF THE INVENTION

The present invention relates to hoisting and supporting apparatus in general and in particular to relatively lightweight, portable, rugged hoisting and supporting apparatus for private and light commercial usage. It has a high strength-to-weight ratio, can be collapsed to save space for transportation and storage and can be assembled by one person without the exercise of a great deal of strength, agility or mechanical ability.

Unlike jacks and the like, which are inserted beneath a load to raise and support a load, the apparatus of the present invention may be classified with overhead hoisting and supporting apparatus. As such, it has particular utility and may be used for such jobs as loading and removing camper units, enclosures and the like from the beds of pickup trucks, lifting engines from vehicles, as may be required when a person repairs or replaces an engine in his personal automobile or truck, or repairs and replaces engines or like parts at automobile races, drag races and the like, to lift boats for repair or to place them on trailers, for supporting plastic or canvas sheets for forming tents and wind shelters, and as a means for supporting a swing or other recreational device. For both private and commercial usage, many other applications may come to mind, such as loading materials on trailers or raising loads of other kinds for repair and the like.

Heretofore, in spite of the need, light-weight, rugged, portable, collapsible hoisting and supporting apparatus which has a high strength-to-weight ratio and which can be assembled and disassembled by one person has not been readily available.

SUMMARY OF THE INVENTION

In view of the foregoing, a principal object of the invention is a portable, collapsible hoisting and supporting apparatus, particularly suitable for private and light commercial usage.

Another object of the present invention is a portable, collapsible hoisting and supporting apparatus comprising an arched cross member and two end supporting assemblies for supporting the ends of the cross member, means for slidably fitting the cross member to the supporting assemblies, and hinging means for folding the cross member and the supporting assemblies to reduce the space required for transporting and storing the apparatus.

A principal feature of the present invention is a means for slidably interconnecting the cross member and the supporting assemblies, comprising a pair of spaced parallel plates on the ends of the cross member and a corresponding pair of spaced parallel plates on the top ends of each of the supporting assemblies, which pairs of plates slip together in an interlocking fashion.

Another feature of the present invention is a means for folding the supporting assemblies and the cross member by the incorporation of a hinging means at the top of the supporting assemblies, in the middle of each leg of each of the supporting assemblies and in the middle of the cross member.

To assemble the apparatus, the cross member is unfolded and the legs of the supporting assemblies are spread apart with the lower sections of each of the leg members folded with respect to the top sections of the leg members. The cross member is then inserted into the top of one of the supporting assemblies. After this step, the lower sections of the leg members of that supporting assembly are fully extended. Next, the opposite supporting assembly is fitted to the cross member with the lower sections of its legs folded with respect to the upper sections. After this supporting assembly is fitted to the cross member, the lower sections of its leg members are unfolded. The apparatus is then fully erect. Hoisting tackle is then attached to the cross member and to a suitable winch, windlass, or the like, which may be attached to a cross brace used for bracing the leg members.

When the apparatus is no longer required, the apparatus can be disassembled in reverse order and the various parts folded for transportation or storage.

A BRIEF DESCRIPTION OF THE DRAWINGS

The above and other objects, features and advantages of the present invention will become apparent from the following detailed description of the accompanying drawings in which.

DETAILED DESCRIPTION

Figure 1:
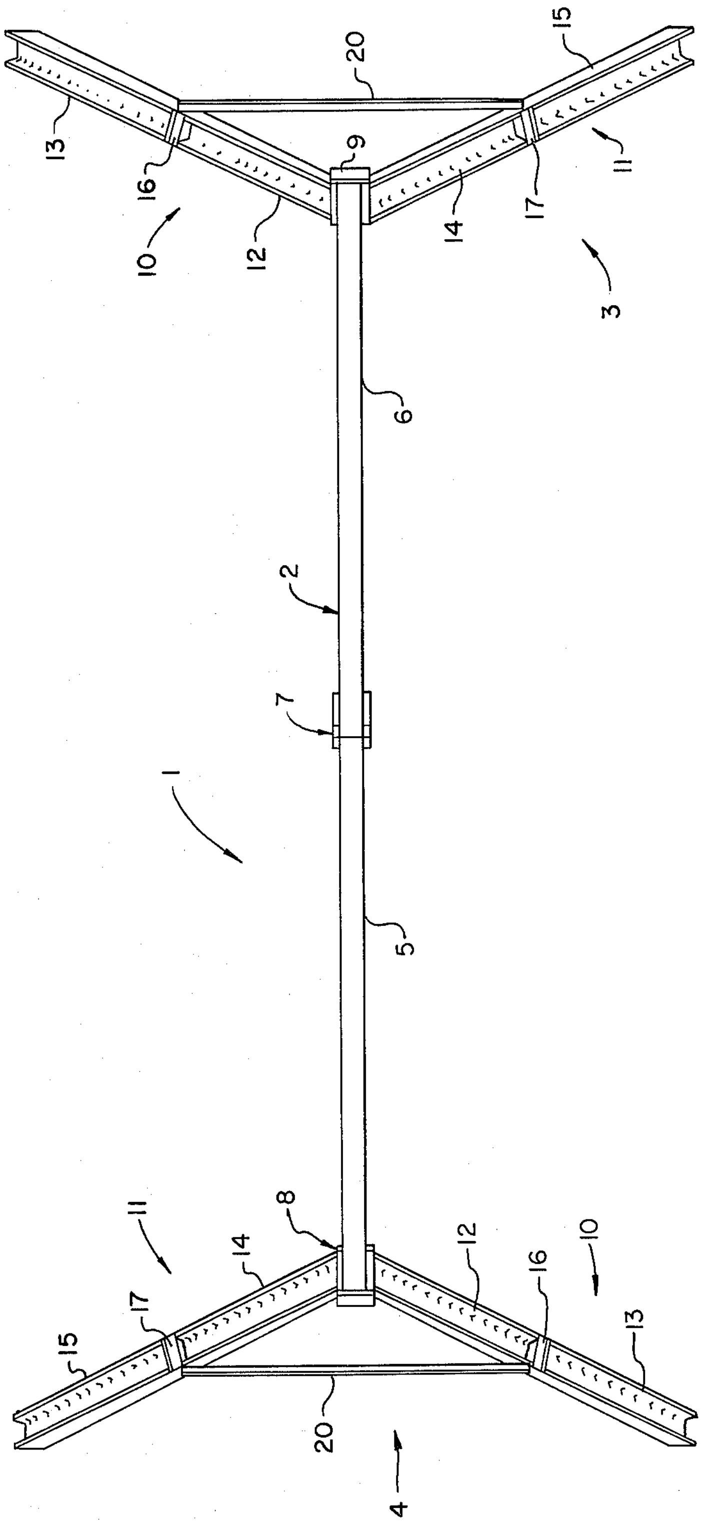
FIG. 1 is a plan view of an apparatus according to the present invention.
Figure 2:
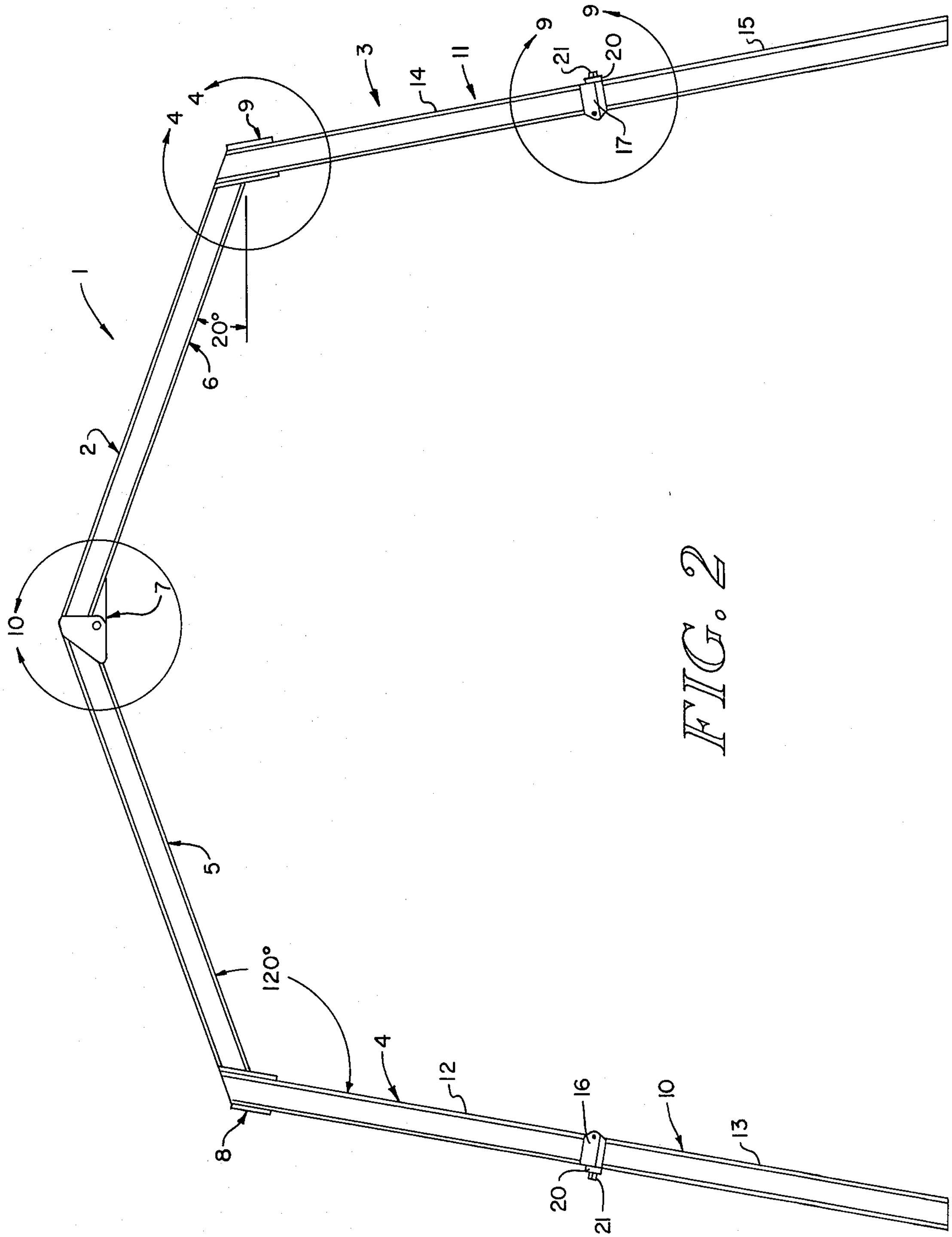
FIG. 2 is a side elevation view of FIG. 1.
Figure 3:
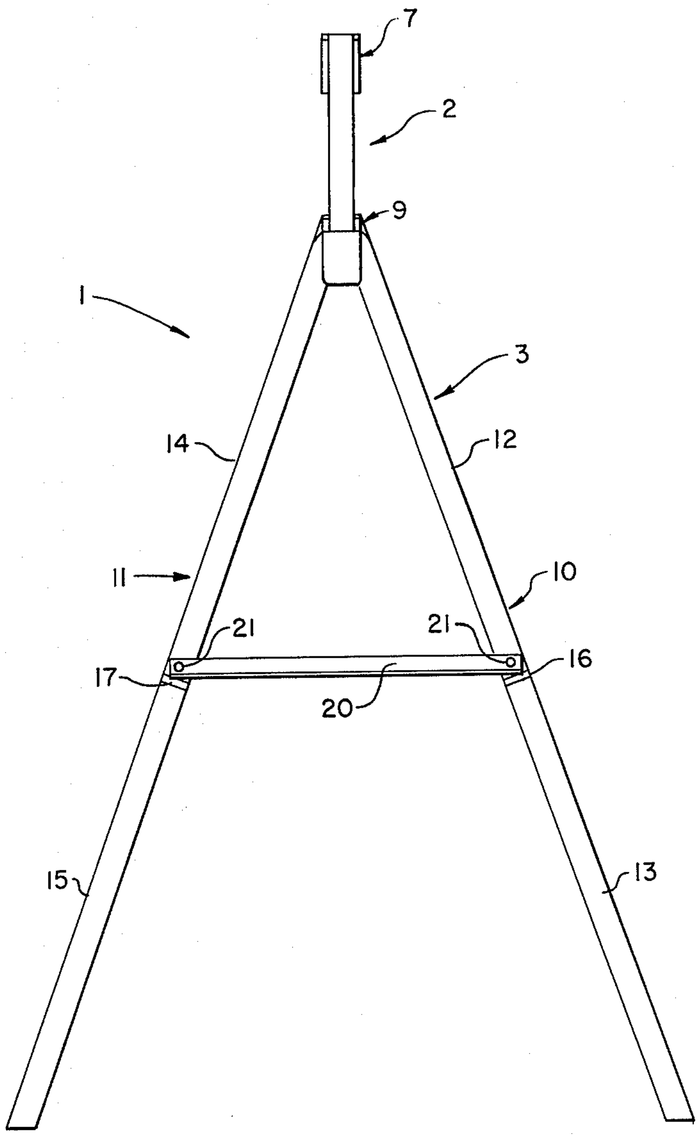
FIG. 3 is an end view of FIG. 2.

Referring to FIGS. 1, 2 and 3, there is provided, in accordance with the present invention, a hoisting and supporting apparatus designated generally as 1. In apparatus 1 there is provided an arched cross member 2 and a pair of supporting assemblies 3 and 4 for supporting each end of the cross member 2. As shown in FIGS. 1 and 2, cross member 2 comprises a left-hand section 5 and a right-hand section 6. The sections 5 and 6 typically comprise I-beams and are pivotably connected by a hinging means 7. At the left end of the section 5 and at the right end of the section 6 there is provided an interconnecting means 8 and 9, respectively. Interconnecting means 8 and 9 are provided for interconnecting the cross member 2 to the top of the supporting assemblies 3 and 4. As seen more clearly in FIG. 3, each of the supporting assemblies 3 and 4 comprises a pair of leg members 10 and 11. Leg member 10 comprises an upper I-beam section 12 and a lower I-beam section 13. Leg member 11 comprises an upper I-beam section 14 and a lower I-beam section 15. The sections 12 and 13 are pivotably coupled by a hinging means 16. The sections 14 and 15 are pivotably coupled by a hinging means 17. Coupled between the leg members 10 and 11 is a cross bracing member 20. Cross bracing member 20 is bolted to the hinging members 16 and 17 as by a bolt 21 for preventing relative movement of the leg members 10 and 11.

Figure 4:
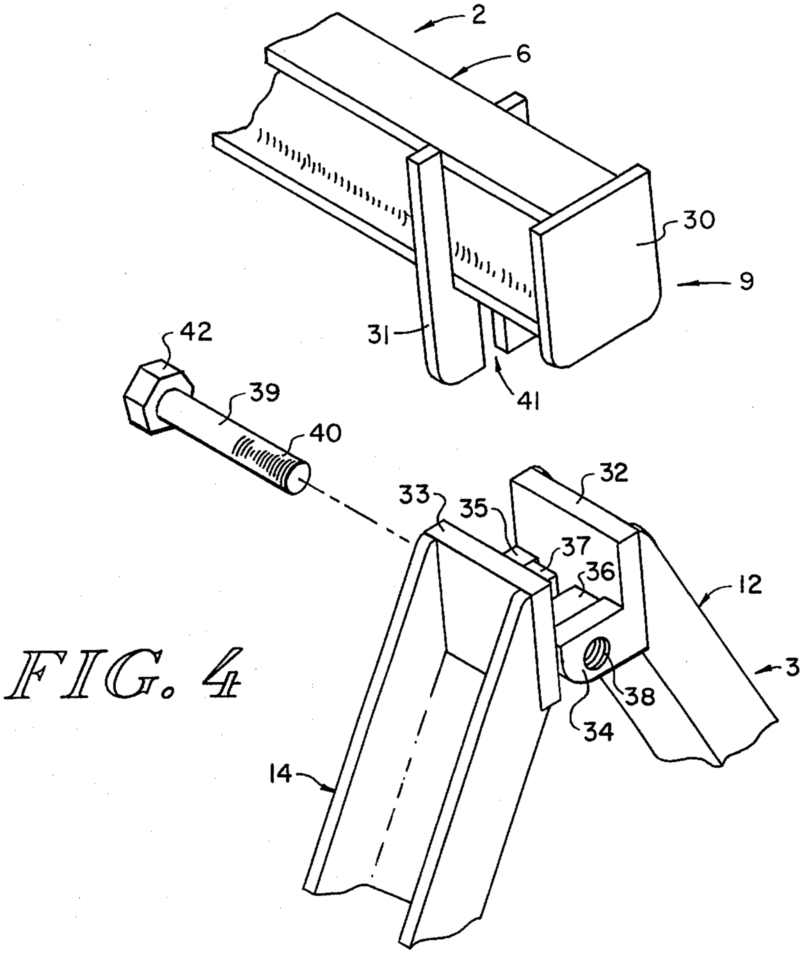
FIG. 4 is an enlarged perspective view of one end of the cross member and the top of one of the end supporting assemblies within the lines 4—4 of the apparatus of FIG. 2.
Figure 5:
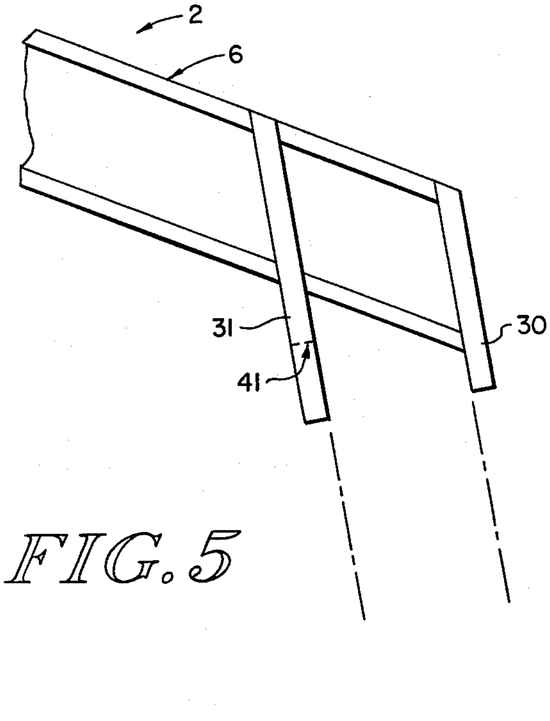
FIG. 5 is a side elevation view of the end of the cross member of FIG. 4.
Figure 6:
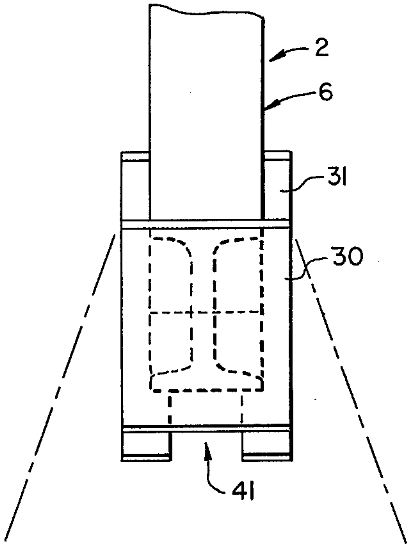
FIG. 6 is an end view of FIG. 5.

Referring to FIGS. 4, 5 and 6, there is shown a perspective view of the interconnecting means 9 of FIG. 2. Interconnecting means 8 is identical. As shown in FIG. 4, at the end of the I-beam section 6 there is provided a pair of spaced parallel plate members 30 and 31. At the ends of the I-beam sections 12 and 14 there is provided a second pair of spaced parallel plate members 32 and 33. Plate members 32 and 33 are orientated substantially perpendicular to the plate members 30 and 31. Extending inwardly and substantially perpendicular from the plate member 32 there is provided a plurality of members 34 and 35. Extending inwardly and substantially perpendicular from the plate member 33 there is provided a plurality of members 36 and 37. The members 36 and 37 interleave the members 34 and 35. Provided in the members 34, 35, 36 and 37 is a bolt-receiving hole 38 for receiving a bolt 39 having threads 40 and a head 42. The bolt-receiving hole 38 is threaded in the member 34 for receiving the threads 40. It is not threaded in the members 35, 36 and 37 so as to permit the members 34–37 to pivot freely about the bolt member 39 as the leg members 12 and 14 are moved relative to each other. Centrally located in the plate member 31 there is provided a slot 41. The slot 41 is provided for providing a clearance for the head 42.

Figure 7:
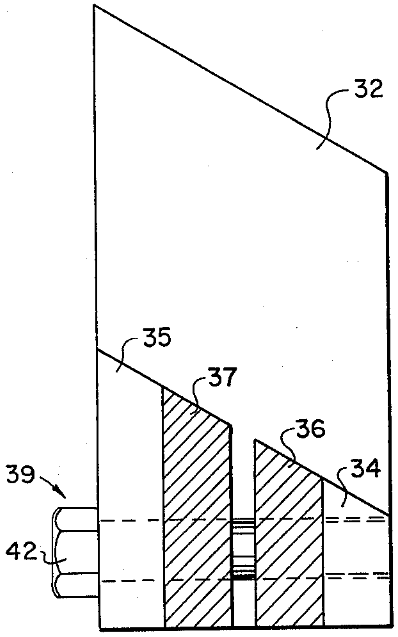
FIG. 7 is a cross-sectional view in the plane of the bolt of the upper end of the supporting assembly of FIG. 4.
Figure 8:
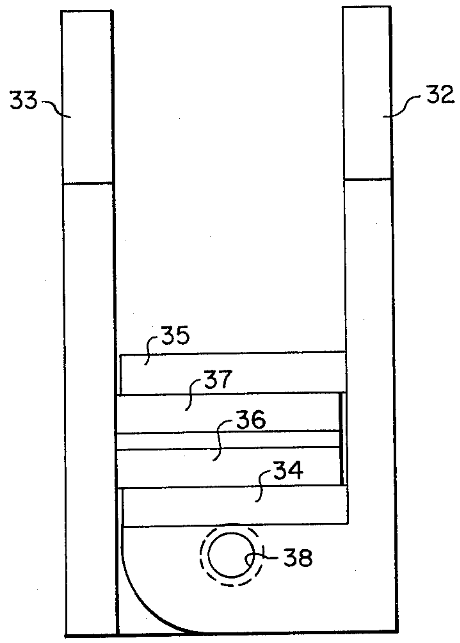
FIG. 8 is an end view of FIG. 7.

Referring to FIGS. 2, 7 and 8, the cross member 2 and the supporting assemblies 3 and 4 interconnect at an angle exceeding 90° such that the cross member 2 forms an arch. As seen more clearly in FIGS. 7 and 8, the upper surfaces of the interleaving members 34, 35, 36 and 37 of the interconnecting means 9 at the top of the leg members 12 and 14 are provided with a corresponding beveled surface such that the under surface of the I-beam 6 between the plate members 30 and 31 sets flush on the surface of the members 34, 35, 36 and 37. The length of the members 34–37 corresponds to the width of the I-beam 6 whereas the distance between the interior surfaces of the plate members 30 and 31 corresponds to the width of the plate members 32 and 33. In practice, this distance is made slightly larger than the width of the plate members 32 and 33 so that the members 32 and 33 will freely slide between the members 30 and 31 and embrace the I-beam 6, while at the same time not being so separated as to cause undue looseness of the structure.

Figure 9:
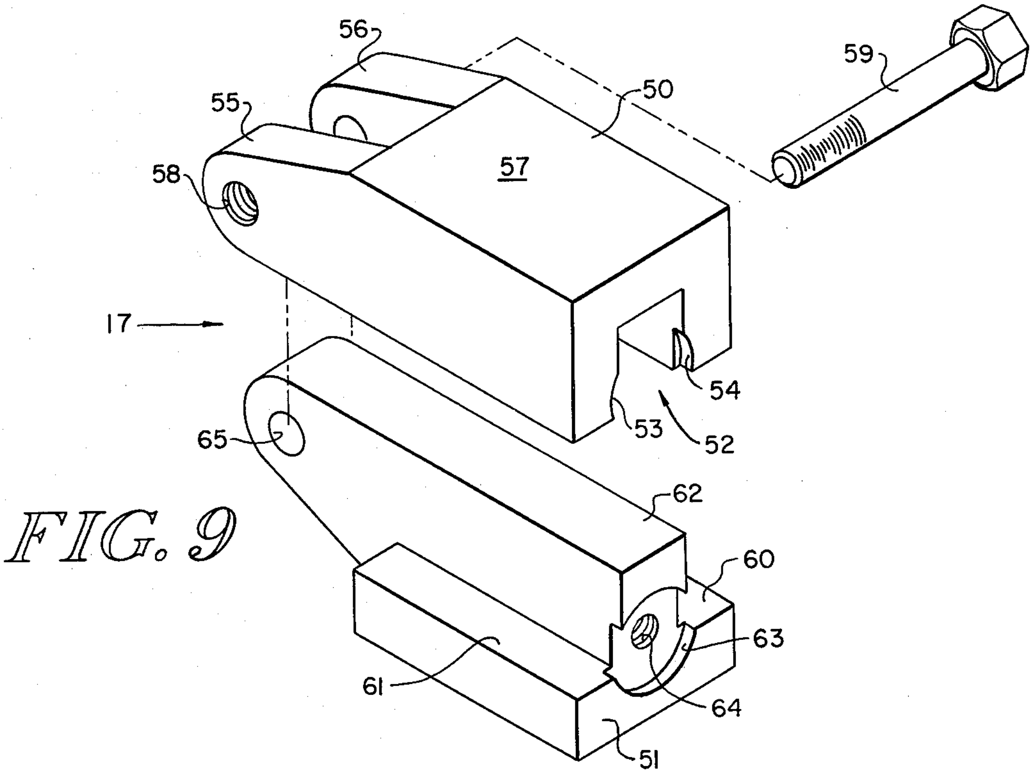
FIG. 9 is an enlarged perspective view of a hinging means in the leg members of the supporting assembly within the lines 9—9 of FIG. 2.

Referring to FIG. 9, there is shown a perspective view of the hinging means 17. The hinging means 16 is identical. The hinging means 17 comprises a U-shaped member 50 and a T-shaped member 51. In the center of the U-shaped member 50 there is provided an elongated slot 52 having a pair of recessed surfaces 53 and 54. The recessed surfaces 53 and 54 are provided for receiving the head of the bolt 21 described above with respect to FIG. 2, which is used for securing the horizontal bracing member 20. At the opposite end of the slot 52 the legs of the U-shaped member 50 are terminated in a pair of lug members 55 and 56. Lug members 55 and 56 terminate along their upper inner edges at a planar surface 57. Planar surface 57 is a surface to which the I-beam leg section 14 is welded or otherwise rigidly attached. Extending through each of the lug members 55 and 56 is a bolt-receiving hole 58. In addition, the bolt-receiving hole 58 in the lug member 55 is provided with internal threads for receiving the threads of a bolt 59.

The T-shaped member 51 is provided with a pair of laterally extending legs 60 and 61 and an intermediate leg 62 extending perpendicular therefrom. The intermediate leg 62 is dimensioned to slidably fit within the slot 52 of the U-shaped member 50. At one end of the intermediate member 62 there is provided a countersunk recess 63 and a threaded bolt-receiving hole 64. Threaded recess 63 corresponds to the clearance recesses 53 and 54 in the member 50. At the opposite end of the member 62 there is provided a bolt-receiving hole 65 corresponding to the hole 58 for receiving the bolt 59. The under surface of the laterally extending leg members 61 and 60 comprises a planar surface like the surface 57 to which is welded or otherwise rigidly attached the lower leg section 15.

Figure 12:
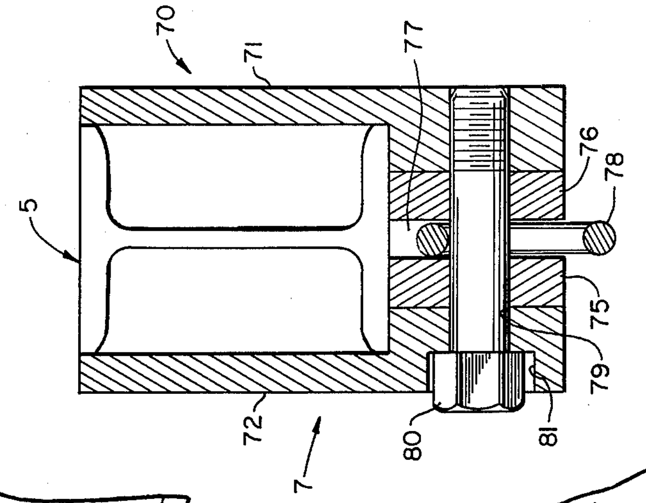
FIG. 12 is a cross-sectional view taken along the lines A—A of FIG. 10.
Figure 10:
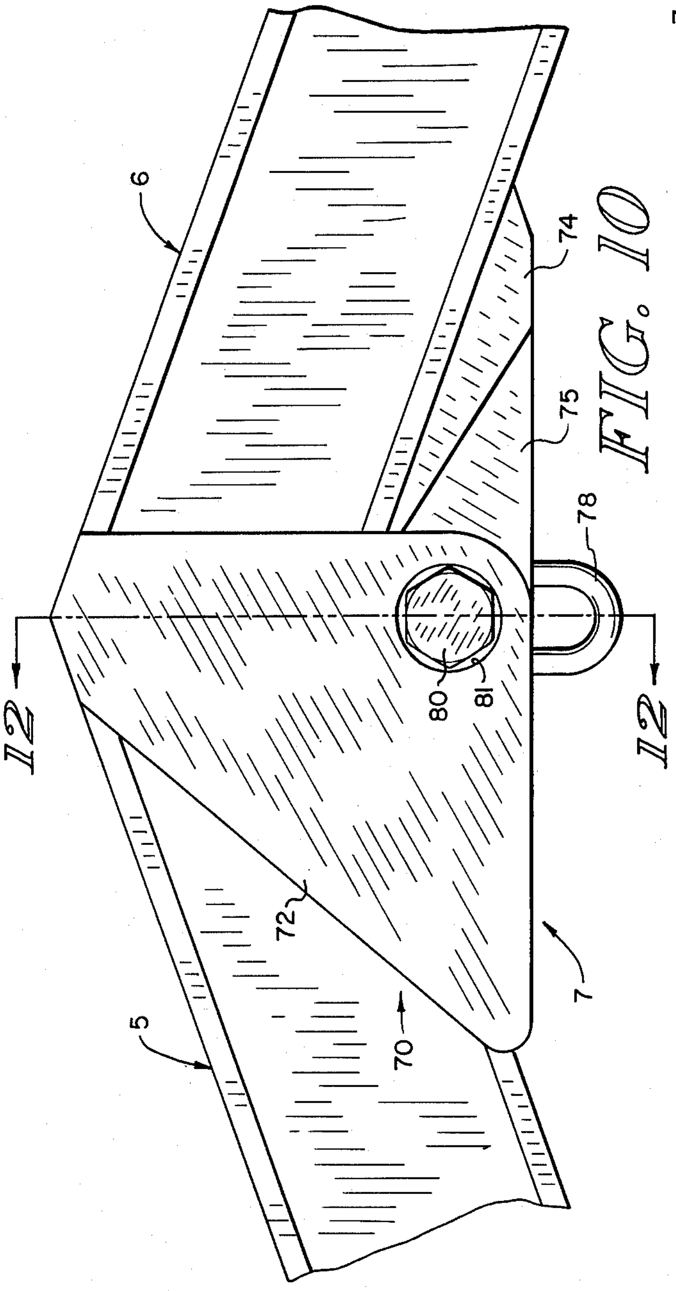
FIG. 10 is an enlarged elevation view of the hinging member in a cross member within the lines 10—10 in FIG. 2 according to the present invention.
Figure 11:
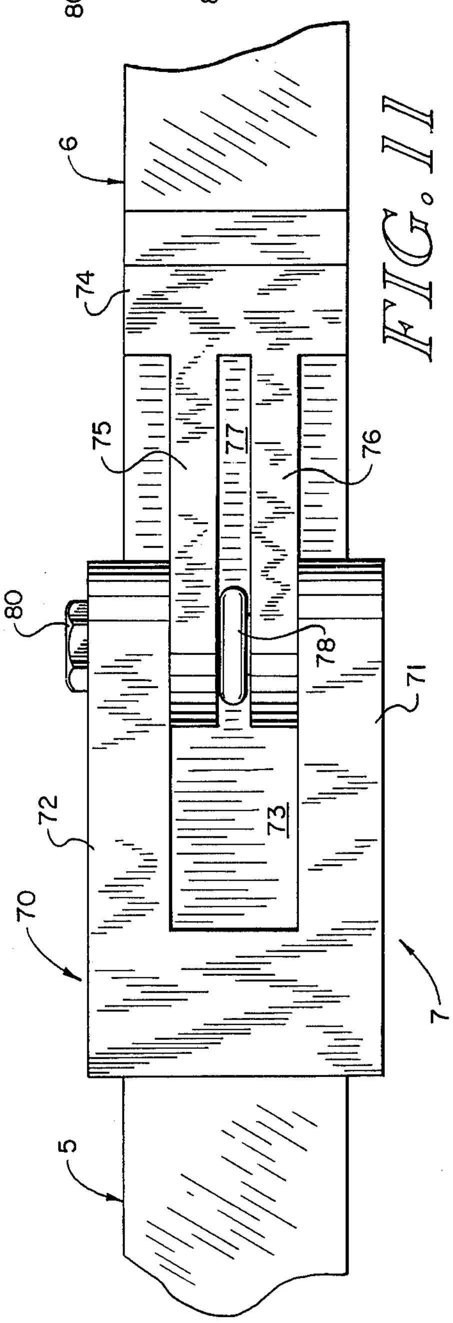
FIG. 11 is a bottom view of FIG. 10.

Referring to FIGS. 10, 11 and 12, the cross member hinging means 7 comprises a U-shaped member 70. Member 70 is rigidly attached to the interior end of the I-beam member 5 as by welding or the like and comprises a pair of spaced parallel plate-like members 71 and 72 which embrace the I-beam member 5. Beneath the I-beam 5 and extending inwardly toward the opposite end of the I-beam 5, there is provided a clearance slot 73, as seen more clearly in FIGS. 11 and 12. Rigidly attached to the interior end of the I-beam 6 is a hinging member 74 having a pair of elongated spaced leg members 75 and 76. Leg members 75 and 76 are recessed from the lateral edges of the member 74, extend between the leg members 71 and 72 into the space 73 and are separated by a slot or space 77 in which is provided a hoisting tackle attachment ring or the like 78. At the interior end of the members 71, 72, 75 and 76 there is provided a bolt-receiving hole 79. Hole 79 is threaded in the member 71 for threadably receiving a bolt 80. In the member 72 there is provided a recess 81 for receiving the head of the bolt 80.

Figure 13:
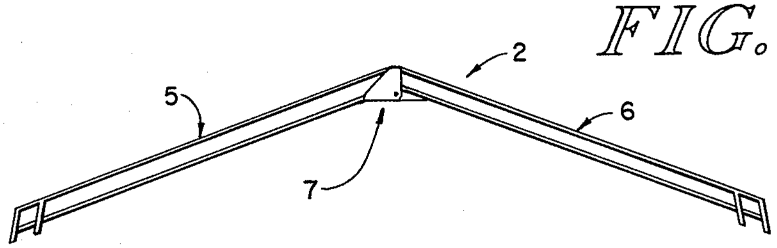
FIG. 13 is an elevation view of an unfolded cross member according to the present invention.
Figure 14:
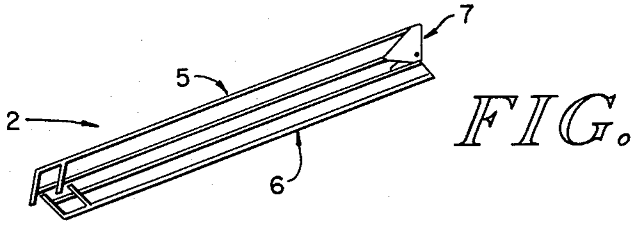
FIG. 14 is an elevation view of the member of FIG. 13 folded.
Figure 15:
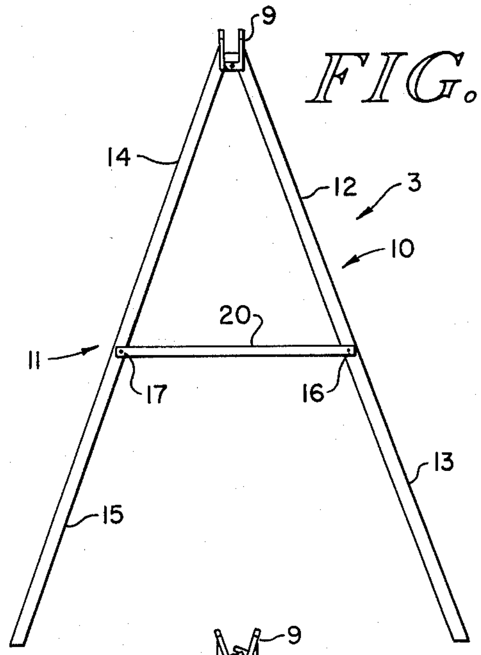
FIG. 15 is an elevation view of a supporting assembly according to the present invention.
Figure 16:
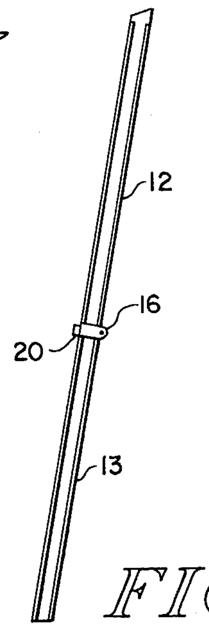
FIG. 16 is a side view of FIG. 15.

Referring to FIGS. 13 and 14, when the arched cross member 2 is removed for storage or transportation from the end supporting assemblies 3 and 4, it is folded at the hinging means 7, as shown in FIG. 14. When fully extended, as shown in FIG. 13, the members 5 and 6 described approximately a 20° angle with respect to a horizontal plane and approximately a 120° angle with respect to the leg members in the end assemblies 3 and 4.

Figure 17:
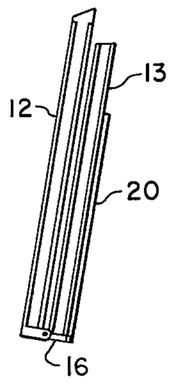
FIG. 17 is a side view of the apparatus of FIG. 16 with the upper and lower sections of the leg members folded upon themselves.
Figure 18:
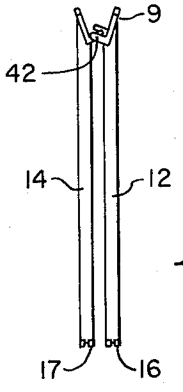
FIG. 18 is an end view of the apparatus of FIG. 17 with the leg members themselves folded together.

Referring to FIGS. 15, 16, 17 and 18, when the arched cross member 2 is removed from the end supporting assemblies 3 and 4, the cross brace 20 is removed by unbolting it from one of the hinging members 16 or 17. After the brace 20 is unbolted, as from the hinging member 16, it is pivoted with respect to hinging member 16 to lie along a lower section 13 of the leg 10. After the brace member is pivoted to lie along the section 13 of the leg 10, the section 13 and the section 15 are pivoted with respect to their respective hinging means 16 and 17 upwardly to lie against the upper sections 12 and 14, as shown in FIG. 17. After the sections 13 and 15 are folded against the sections 12 and 14, respectively, the leg members 10 and 11 are pivoted inwardly about the hinging bolt 42, as shown in FIG. 18. The arched cross member 2 and the two end supporting assemblies 3 and 4 are then placed in an appropriately sized box for storage or transportation. In assembly, the reverse steps are used.

A specific embodiment of a hoisting and supporting apparatus according to present invention is described comprising specific types of hinging means for folding the leg members in the end supporting assemblies and the cross member, and a specific type of interconnecting means for interconnecting the arched cross member and the end supporting assemblies. The embodiment described also employs I-beams, preferably of a lightweight material such as aluminum or an alloy thereof. It is contemplated and intended, however, that various changes may be made to the hinging means and interconnecting means disclosed, as well as to the types of structural members employed. For example, the hinging means may employ pins held in place by cotter pins for pivoting of the leg members. The interconnecting means, instead of being slidably fitted together, may be secured as by bolting. Indeed, the specific structure of the hinging means and interconnecting means is not critical to the invention and may be changed if necessary for a particular application and, for example, instead of I-beam members, H-beams, U-shaped channels, rectangular channels and the like may be used. In addition to these changes, the bottom or lower ends of each of the leg members in the end supporting assemblies may be fitted, as by an appropriate swiveling apparatus to flat, plate-like members for supporting the apparatus on soft and uneven surfaces. For these reasons, it is intended that the scope of the invention be not determined solely by reference to the embodiments described but rather by reference to the claims hereinafter provided and their equivalents.

What is claimed is:

1. A portable, collapsible hoisting and supporting apparatus comprising:

a cross member;

means for supporting the cross member, including means permitting separation of the cross member from the supporting means when the hoisting apparatus is not in use;

means for folding the cross member after it is separated from the supporting means; and means for folding the supporting means after the cross member is separated from the supporting means for reducing the size of the hoisting apparatus for storage and wherein the means for supporting the cross member comprises interlocking means having a first part located at the ends of the cross member and a second part located at the top of the supporting means, which parts are slipped together in an interlocking relationship during assembly of the hoisting apparatus, prevent relative rotation of the cross member and the supporting means after assembly and are slipped apart during disassembly of the hoisting apparatus for storage when the hoisting apparatus is not in use, wherein the supporting means comprises a first and a second supporting means for supporting each end of the cross member, respectively; the first part of the interlocking means comprises a pair of spaced parallel plate members at each end of the cross member of bracketing the upper ends of the first and the second supporting means; and the second part of the interlocking means comprises a pair of spaced parallel plate members at the top of each of the first and the second supporting means for bracketing the ends of the cross member in an interlocking relationship with said plate members on said cross member; and wherein the cross member and the first and the second supporting means each comprises an I-beam assembly, one pair of the parallel plate members on the cross member is rigidly attached to each end of the cross member I-beam assembly, and one pair of the spaced parallel plate members attached to the first and the second supporting means is rigidly attached to the top of each end of the first and the second supporting means I-beam assembly at an angle substantially normal to each of the pair of plate members attached to the cross member I-beam assembly.

2. An apparatus according to claim 1 wherein each of the pair of spaced parallel plate members attached to the ends of the cross member I-beam assembly slidably captures, in the space between their respective spaced plate members, the plate members of one of the pair of spaced parallel plate members attached to the first and the second supporting means I-beam assemblies.

3. An apparatus according to claim 2 wherein each of the first and the second supporting means I-beam assemblies comprises a first and a second leg member and means for pivotably coupling one end of each of the first and the second leg members together, and wherein one of the parallel plate members in each of the pair of parallel plate members attached to the top of the supporting means I-beam assemblies is attached to each of the first and the second legs of the supporting means I-beam assemblies on opposite sides of the leg coupling means; and further comprising means extending inwardly perpendicular from each of the plate members on the opposite sides of the leg coupling means for supporting the ends of the cross member I-beam assembly.

4. A portable, collapsible hoisting and supporting apparatus comprising:

a cross member;

means for supporting the cross member, including means permitting separation of the cross member from the supporting means when the hoisting apparatus is not in use;

means for folding the cross member after it is separated from the supporting means; and means for folding the supporting means after the cross member is separated from the supporting means for reducing the size of the hoisting apparatus for storage, and wherein the cross member and the supporting means each has two ends and the folding means for folding the cross member and the folding means for folding the supporting means each comprises hinging means located intermediate their respective ends; and wherein the cross member comprises a first and a second I-beam member, the supporting means comprises a first and a second triangularly-shaped supporting assembly, each of the first and the second triangularly-shaped supporting assemblies comprises a first and a second leg member, each of the first and the second leg members comprises a first and a second I-beam member, the hinging means for folding the cross member comprises first plate means attached to the interior end of the first I-beam member in the cross member and the second plate means which interleaves the first plate means attached to the interior end of the second I-beam member in the cross member, hinge pin receiving holes located in the first and the second plate means for receiving a hinge pin means; hinge pin means for pivotably coupling the first and the second plate means, the plate means and the hinge means being so located and the interior ends of the cross member I-beam members being so shaped that, when the first and the second cross member I-beam members are unfolded, they form an arch in which their adjacent ends abut for restricting the extent to which the cross member I-beam member can be unfolded, and means attached to the first and the second cross member I-beam members for attaching hoisting tackle to the cross member I-beam members.

5. An apparatus according to claim 4 wherein the supporting means comprises a pair of triangularly shaped supporting means; each of the triangularly shaped supporting means comprises a means for removably supporting one end of the cross member, including means permitting separation of the cross member from the supporting means when the hoisting apparatus is not in use; and a pair of leg members, and said hinging means comprises first hinging means for pivotably coupling one end of the leg members for folding the leg members together; and second hinging means for intermediate the ends of each of the leg members for folding the ends of each of the leg members together.

6. An apparatus according to claim 5 comprising a bracing member extending between each of the leg members in each pair of leg members for bracing the leg members and preventing their relative movement when the apparatus is in use.

7. A portable hoisting apparatus comprising:

an arch-shaped cross member;

hinge means intermediate the ends of the arch-shaped cross member for folding the cross member;

means for attaching hoisting tackle to the cross member;

a first and a second supporting assembly each comprising a first and a second leg member for supporting the ends of the cross member;

means located at the ends of the cross member and at the top of the first and the second leg members in each of the supporting assemblies for slidably interconnecting the cross member and the supporting assemblies;

means for pivotably coupling one end of each of the first and the second leg members together for closing and spreading the first and the second leg members together and apart, each of said leg members comprising a first and a second leg section; and means located intermediate the first and the second leg sections for folding and unfolding the leg sections to reduce the space required for storing the hoisting apparatus when the apparatus is disassembled for storage.

8. A portable, collapsible hoisting and supporting apparatus comprising:

a cross member;

means for supporting the cross member, including means permitting separation of the cross member from the supporting means when the hoisting apparatus is not in use;

means for folding the cross member after it is separated from the supporting means; and means for folding the supporting means after the cross member is separated from the supporting means for reducing the size of the hoisting apparatus for storage, and wherein the cross member and the supporting means each has two ends and the folding means for folding the cross member and the folding means for folding the supporting means each comprises hinging means located intermediate their respective ends, and wherein the supporting means comprises a first and a second triangularly-shaped supporting assembly, each of the first and the second triangularly-shaped supporting assemblies comprises a first and a second leg member, each of the first and the second leg members comprises a first and a second I-beam member; the hinging means for folding the supporting means comprises a T-shaped member attached to the interior end of the first I-beam member in each of the leg members, and a U-shaped member attached to the interior end of the second I-beam member in each of the leg members for slidably receiving the T-shaped member; hinge pin receiving holes in the T-shaped and the U-shaped members for receiving a hinge pin; and hinge pin means for pivotably coupling the T-shaped and the U-shaped members, the T-shaped and the U-shaped members being so positioned that, when the leg members are unfolded, the legs of the U-shaped member abut the laterally extending legs of the T-shaped member for limiting the amount the leg member can be unfolded.

* * * * *